United States Patent Office 3,202,483
Patented Aug. 24, 1965

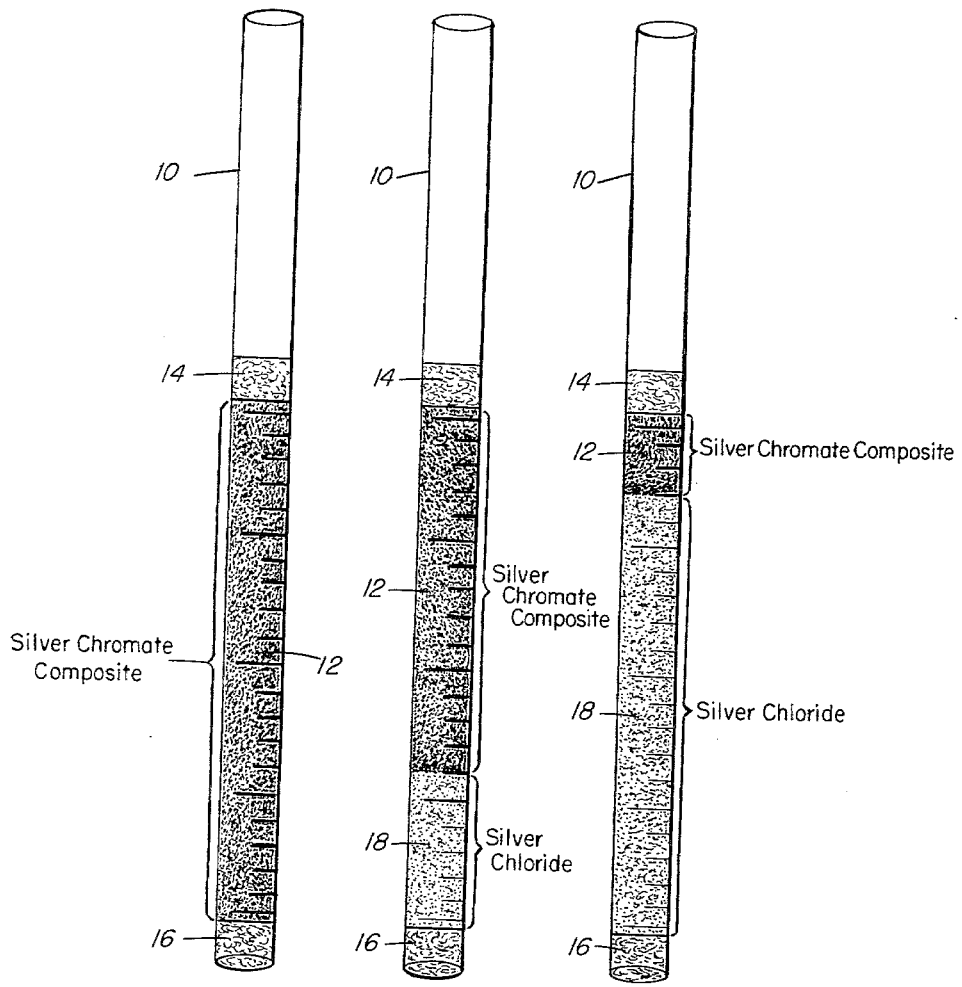

3,202,483
TESTING OF SOLUTIONS
Thomas J. McKeon, Cresskill, N.J., and John P. O'Hara, Staten Island, N.Y., assignors to Socony Mobil Oil Company, Inc., a corporation of New York
Filed May 28, 1963, Ser. No. 283,770
6 Claims. (Cl. 23—230)

This invention relates to the testing of solutions, and more particularly to the testing of aqueous solutions for determining the presence of chloride ion. In one of its aspects, the invention relates to the testing of used marine lubricating oils for determining the presence of sea-water chlorides. Still more particularly, in this aspect, the invention relates to an improved method for determining the amount of sea-water chloride present in used marine lubricating oils and apparatus suitable for such purpose.

Among the various instances in which a simple and accurate determination of the presence of chloride ion in aqueous solutions is highly desirable, is that in which used marine lubricating oils are tested for ascertaining possible contamination thereof by sea-water. Thus, for example, the necessity for such testing may be indicated because of equipment malfunction or change in engine operating conditions in which the aforementioned oils are employed as lubricants. The results of such tests can, therefore, reveal whether the lubricating oil is being contaminated by sea-water, by reason of faulty mechanical equipment.

Heretofore, in testing for the presence of chlorides, samples of the used marine lubricating oil were diluted with a suitable light solvent, centrifuged, and the separated water phase at the bottom of the centrifuge tube was removed for chloride analysis. The analysis was carried out by adding silver nitrate to the separated water phase. The formation of insoluble silver chloride in the form of a white precipitate denoted a positive test for the presence of the chloride ion. Although this test was found to be far from satisfactory in laboratory use, it was also found to be practically unworkable in the field, for example, in marine ports or emergency ports, where laboratory facilities are not available. Thus, for example, if after centrifuging of the lubricating oil, a water phase is not formed, no test can be made for chloride ion, although the oil may actually have chloride contamination. In addition, such tests require, by necessity, a centrifuge and various assorted glassware apparatus; a delicate manipulation to remove water from the centrifuge tube; personal safety considerations in handling of strong acids; relatively easy contamination of chemicals in a marine atmosphere; and the possibility of inaccurate conclusions by reason of the precipitation of organic acids in a manner similar to that of the chlorides. Hence, prior to the present invention, no simple, accurate and rapid method has been found for determining the presence of chloride ion in an aqueous solution, and particularly for obtaining such determination with respect to the presence of chloride ion in used marine lubricating oils.

It is, therefore, an object of the present invention to provide a new and improved method for determining the presence of chloride ion in aqueous solutions.

Another object of the invention is to provide a new and improved method for determining the presence of chloride ion in lubricating oils.

Still another object of the invention is to provide a new and improved method for determining the presence of chloride ion in aqueous solutions or in used marine lubricating oils, and which can be performed in a simple, accurate and rapid manner.

A still further object of the invention is to provide suitable apparatus for obtaining the aforementioned determination of the presence of chloride ion.

Other objects and advantages inherent in the invention will become apparent from the following detailed description.

In accordance with the improved method of the present invention, as more fully hereinafter described, there is provided a simple, accurate and rapid test for determining the presence of chloride ion in aqueous solutions, and particularly with respect to the testing of used marine lubricating oils for ascertaining possible contamination thereof by sea-water. This test is based upon the discovery that when an aqueous solution containing chloride ion, is brought into contact with a composite comprising silver chromate deposited on an absorbent, the composite, which normally has a brownish appearance is changed to a lighter color, varying from a yellowish to a whitish appearance, resulting from the formation of relatively insoluble silver chloride from the silver chromate. When this principle is utilized in one of its more practical applications, the quantity of chloride ion present in an aqueous solution can be measured by the relative quantity of silver chromate which is converted to the silver chloride. Thus, when a dry, brown-colored composite of silver chromate deposited on an absorbent, such as silica gel, is packed in a glass tube, an aqueous solution containing chloride ion coming into contact with this composite, causes at least a portion of the composite to turn lighter from a yellowish to a whitish appearance, due to the conversion of the brown silver chromate to the whitish silver chloride. A definite color change is observed, with a sharp line indicating reacted and unreacted silver chromate. The linear length of the neutralized portion of the composite (i.e., that portion which has been converted to silver chloride) is proportional to the amount of chloride ion present in the aqueous solution. This length can, therefore, be measured and can be compared with similarly constructed tubes containing similarly prepared silver chromate-silica gel composites that have been used to measure chloride-containing aqueous solutions of known concentrations. To facilitate such measurement, the tube may be suitably calibrated, if so desired.

When aqueous solutions which are strongly acidic or strongly alkaline are tested by the method of the present invention, the silver chromate in the composite may be dissolved and be converted from the aforementioned brownish color to lighter yellowish or whitish appearance, even though no actual chloride ion is present. On the other hand, where the pH value of the aqueous solution is maintained between about 6 and about 10, the aforementioned color change only occurs when chloride ion is actually present. Therefore, where the aqueous solution to be tested has a pH value outside the aforementioned range, suitable buffering agents may be added to adjust the pH to a value between about 6 and about 10.

While the composite of silver chromate deposited on the absorbent is prepared in such manner that a sufficient quantity of silver chromate is present to react with all of the chloride ion permitted to come into contact therewith, and may, therefore, vary to a high degree with respect to the quantity of absorbent present in the composite, the presence of certain proportions of silver chromate and absorbent are generally maintained, from a practical standpoint. Thus, composites are generally employed which comprise silver chromate in an amount between about 0.25 percent and about 5 percent, and, correspondingly, an absorbent in an amount between about 99.75 percent and about 95 percent, by weight. Composites comprising silver chromate in an amount between about 0.25 percent and about 0.5 percent, and, correspondingly, absorbent in an amount between about 99.75 percent and about 99.5 percent, by weight, are preferred.

The preparation of the composite is carried out by wetting a predetermined amount of the absorbent with an aqueous silver nitrate solution, and then evaporating the thus-treated absorbent to dryness. The dried absorbent is then reacted with an aqueous solution of sodium chromate and the resulting composite is then evaporated to dryness. The composite is then ready for use in the improved method of the present invention. As a more specific and illustrative example of the application of the method for preparing the aforementioned silver chromate-absorbent composite, 100 grams of silica gel are wetted with 100 ml. of a 0.02 M aqueous solution of silver nitrate. As indicated above, the thus-treated silica gel is placed on a steam plate and is evaporated to dryness. The dried gel is then reacted with 100 ml. of a 0.03 M aqueous solution of sodium chromate, and the resulting composite is then evaporated and ready for use as a chloride ion indicator.

In one of the more practical applications of the apparatus suitable for carrying out the improved method of the present invention, a small plug of cotton, or other suitable porous material, is placed in one end of a length of small-bore transparent glass tubing. The dried composite is then packed into the tubing, followed by the insertion of a second plug, so that the composite is held firmly in place by the two plugs. Placing an open end of the tube into an aqueous solution containing dissolved chloride ion, will cause the solution to rise up the tube by capillary action, wetting the composite, and affecting the aforementioned color change from a brown to a yellowish or whitish appearance of such linear length of the composite as is propositional to the quantity of chloride ion present in the solution being tested.

While silica gel has been indicated as a suitable absorbent material upon which the silver chromate may be deposited or dispersed, various other materials may also be employed, for example, silica, silica-alumina, silica-alumina gel, silica-magnesia, glass particles, various vitreous materials, various clays, diatomaceous earth, kieselguhr, pumice, magnesia, alumina-gel, zinc aluminate, zinc alumina, zinc spinel, titania, thoria, zirconia, fuller's earth, "Superfiltrol," sawdust, wood-flour, and any other materials which are capable of absorbing and distributing the silver-chromate in a homogeneous manner. Suitable binders may also be employed in combination with the absorbent material. Preferably, the absorbent employed is a light-colored material to facilitate the observance of subsequent color change in the presence of chloride ion.

In some instances, where a marine lubricating oil comes into contact with sea-water in the course of its use, water is evaporated-off during high temperature circulation in the system and the chloride salts are left in suspension. In order to carry out the above-described determination of the quantity of these salts which are present in the oil and also to determine the quantity of these salts which are dissolved in any free water that is still in the oil, a predetermined standard amount of distilled water, e.g., 5 ml., is added to a predetermined standard amount of a mixture of, e.g., 25 ml. of the oil and 25 ml. of a light petroleum solvent, e.g., kerosine. Upon mixing, this excess quantity of water enhances the formation of a free water layer upon standing. Into this water layer, the aforementioned open end of the packed glass tube is inserted for conducting the test for chloride ion determination, as previously indicated. It should be noted, in this connection, that the present improved method for chloride ion determination is not limited to and has broader applications than the testing for chloride ion content in used marine lubricating oils, per se, or the aforementioned water extracts therefrom. Any aqueous solution in which the presence of chlorides is suspected, may be subjected to such testing, as, for example, drinking water, boiler water, swimming pool water and various other chloride-containing liquids.

The accompanying drawing will serve to illustrate one form of the specific apparatus suitable for carrying out the improved method of the present invention, and which is a diagrammatic representation exemplifying a specific embodiment of the testing apparatus for making the aforementioned chloride ion determination.

Referring to the drawing, there is provided an elongated graduated glass indicator tube 10, open at one end, as shown in FIGURES 1, 2, and 3, which is approximately 7¼ inches in length and of a relatively small bore (e.g., standard #4 glass tubing having an outside diameter of about 2.5 mm.). Tube 10 is packed with 4 inches of a previously prepared composite 12, as more fully hereinafter described, comprising silver chromate deposited on a suitable absorbent, which, in the present instance, comprises silica gel. Composite 12 is held in position at each end by two plugs of cotton 14 and 16. Upon contact with an aqueous solution containing dissolved chloride ion, as previously described, at least a portion of composite 12 will turn from a brownish to a contrasting lighter appearance, due to silver chloride formation, and varying from light yellow to white. Thus, as shown in FIGURE 1, when tube 10 is immersed in an aqueous solution, free from dissolved chloride ion, the brownish appearance of composite 12 remains unchanged. However, as shown in FIGURE 2, when tube 10 is immersed in an aqueous solution containing a minor concentration of dissolved chloride ion, a portion of composite 12 is converted to the lighter appearing silver chloride 18. As shown in FIGURE 3, when tube 10 is immersed in an aqueous solution containing a relatively high concentration of dissolved chloride ion, a relatively larger portion of composite 12 is converted to a silver chloride 18.

As an example of the method for preparing the aforementioned indicator tubes for chloride ion determination, the composite is first prepared in the following manner: A silver nitrate solution is prepared by dissolving 3.4 grams of reagent grade silver nitrate ($AgNO_3$) in 50 ml. of distilled water, to which is added an amount of a mixture comprising approximately 90 percent ethyl alcohol and 10 percent methyl alcohol, by volume, sufficient to make one liter of solution. The combined components are then thoroughly mixed. A sodium chromate solution is then prepared by dissolving 4.7 grams of reagent grade sodium chromate ($Na_2CrO_4$) in 100 ml. of distilled water, to which is added an amount of a mixture comprising approximately 90 percent ethyl alcohol and 10 percent methyl alcohol, by volume, sufficient to make one liter of solution. The combined components are thoroughly mixed.

100 grams of silica gel, having a particle size of 100 to 200 mesh, are placed into a 600 ml. beaker. 100 ml. of the aforementioned prepared silver nitrate solution are added and thoroughly mixed with the silica gel. The silica gel must be completely wetted by the silver nitrate solution. If necessary, additional quantities of the aforementioned alcohol mixture may be added to effect complete wetting of the silica gel. The beaker and its contents are then placed on a hot plate and evaporated to complete dryness. To the thus-dried silica gel are added 100 ml. of the aforementioned sodium chromate solution. The components are then thoroughly mixed in the beaker. The beaker is again placed on a hot plate and the contents are evaporated to complete dryness, with occasional stirring to prevent spattering. The last traces of water are removed by placing the beaker in a drying oven maintained at 110° C.

A small plug of cotton is next placed into one end of the glass indicator tube, as shown in the drawing, and the tube is then filled with the dried silver chromate-silica gel composite to a height of 4 inches. Approximately 0.3 gram of the composite is required to fill the tube to the aforementioned height of 4 inches. Thereafter another plug of cotton is inserted into the tube and forced down over the composite so that the latter is retained tightly between the two plugs, as shown in the drawing. The indicator tube is now ready for use.

As indicative of the efficacy of the improved method of the present invention for determining the chloride ion content of aqueous solutions, the following examples in Table I disclose the results obtained when different samples of marine lubricating oils containing varying volumetric quantities of water, and either free from, or containing, varying amounts of chloride ion, were subjected to the aforementioned test. In the tests illustrated by these examples, indicator tubes containing a composite comprising approximately 0.30 percent, by weight, of silver chromate deposited on 99.70 percent by weight, of silica gel were employed, and in which the composite was prepared according to the method previously described.

*Table I*

| Example No. | Standard | Length og silver chloride stain in composite | Nature of water |
|---|---|---|---|
| 1 | Oil sample containing 0.1% of distilled water. | No stain | Fresh. |
| 2 | Oil sample containing 0.1% sea-water. | 2½" of 4" column. | Mostly sea-water. |
| 3 | Oil sample containing 0.5% of a 10% salt water solution. | ¾" of 4" column. | Mostly fresh. |
| 4 | Oil sample containing 1.0% of a 10% salt water solution. | 1¼" of 4" column. | Do. | tube contents are thoroughly shaken. The aforementioned indicator tube containing the silver chromate-silica gel composite is inserted into the centrifuge tube and the water is permitted to wet the column of the tube contents, by capillary action. The wetting can be observed by the darkening of the composite column. When the composite column has been completely wetted, the tube is removed from the cylinder and observed for any lightening or yellowing of the composite column. If necessary, color comparators may be employed to interpret any color changes that may take place. In general, if the composite column retains its brownish appearance, the water present is fresh water, free from any chloride ion. If a portion of the composite column turns to a yellowish or whitish apearance to the extent of a height of less than 50 percent, the water is partially salt water. If the composite column turns to a yellowish or whitish appearance to a height of 50 percent or more, the water present is mostly sea-water.

In another series of tests, employing the aforementioned improved method of the present invention and the above-described prepared indicator test tubes, system waters, employed in cooling the engines of a trans-oceanic liner making four voyages, were tested for salt water contamination as shown in Table I. The composite employed in the test tube comprised 0.3 percent silver chromated deposited on 99.7 percent silica gel.

*Table II*

| Test No. | Test day | Chlorides in water (p.p.m.) as NaCl | | | | Percent salt water contamination (approx.) | | | | Discoloration composite column, millimeters | | | |
|---|---|---|---|---|---|---|---|---|---|---|---|---|---|
| | | Voyage I | Voyage II | Voyage III | Voyage IV | Voyage I | Voyage II | Voyage III | Voyage IV | Voyage I | Voyage II | Voyage III | Voyage IV |
| Engine No. 1: | | | | | | | | | | | | | |
| 1 | 1 | 1,065 | 480 | 1,788 | 1,466 | 3.0 | 1.2 | 5.0 | 4.0 | 9 | 6 | 15 | 10 |
| 2 | 2 | 761 | 484 | 808 | 1,466 | 2.0 | 1.2 | 2.2 | 4.0 | 6 | 5 | 7 | 10 |
| 3 | 3 | 865 | 2,880 | 456 | 928 | 2.2 | 8.6 | 1.2 | 2.5 | 8 | 21 | 8 | 8 |
| 4 | 4 | 372 | 520 | 456 | 424 | 1.0 | 1.4 | 1.2 | 1.2 | 4 | 8 | 6 | 6 |
| 5 | 5 | 8,132 | 2,624 | 512 | 6,616 | 27.0 | 8.7 | 1.4 | 18.3 | 35 | 18 | 4 | 31 |
| 6 | 6 | 8,180 | 624 | 400 | 3,296 | 27.0 | 2.0 | 1.1 | 9.0 | 32 | 8 | 4 | 22 |
| 7 | 7 | 6,900 | 816 | 592 | 2,736 | 23.0 | 2.7 | 1.6 | 7.6 | 34 | 8 | 5 | 20 |
| 8 | 8 | 476 | 840 | 344 | 4,256 | 1.5 | 2.8 | 1.0 | 11.8 | 4 | 12 | 5 | 25 |
| Engine No. 2: | | | | | | | | | | | | | |
| 1 | 1 | 242 | 1,736 | 1,488 | 352 | 0.8 | 5.7 | 4.1 | 1.0 | 3 | 13 | 13 | 4 |
| 2 | 2 | 225 | 1,424 | 1,008 | 336 | 0.7 | 4.7 | 2.8 | 1.0 | 4 | 12 | 9 | 4 |
| 3 | 3 | 173 | 896 | 512 | 368 | 0.5 | 3.0 | 1.4 | 1.0 | 3 | 10 | 7 | 5 |
| 4 | 4 | 320 | 832 | 560 | 352 | 1.0 | 2.7 | 1.5 | 1.0 | 5 | 9 | 9 | 4 |
| 5 | 5 | 657 | 680 | 440 | 392 | 2.1 | 2.2 | 1.2 | 1.0 | 6 | 8 | 6 | 4 |
| 6 | 6 | 770 | 2,760 | 512 | 528 | 2.0 | 9.0 | 1.4 | 1.4 | 9 | 16 | 7 | 6 |
| 7 | 7 | 744 | 1,944 | 264 | 544 | 2.0 | 6.4 | 0.7 | 1.4 | 7 | 13 | 2 | 6 |
| 8 | 8 | 735 | 2,464 | 456 | 576 | 2.0 | 8.2 | 1.2 | 1.6 | 5 | 15 | 7 | 6 |
| Engine No. 3: | | | | | | | | | | | | | |
| 1 | 1 | 43 | 44 | 24 | 32 | 0.1 | 0.1 | 0.1 | 0.1 | 3 | 4 | 2 | 2 |
| 2 | 2 | 43 | 60 | | 24 | 0.1 | 0.2 | | 0.1 | 3 | 4 | 2 | 4 |
| 3 | 3 | 35 | 35 | 32 | 20 | 0.1 | 0.1 | 0.1 | 0.1 | 3 | 3 | 3 | 3 |
| 4 | 4 | 606 | 40 | 40 | 24 | 2.0 | 0.1 | 0.1 | 0.1 | 5 | 3 | 3 | 2 |
| 5 | 5 | 186 | 25 | | 32 | 0.6 | 0.1 | | 0.1 | 4 | 3 | 3 | 4 |
| 6 | 6 | 69 | 21 | 20 | 24 | 0.2 | 0.1 | 0.1 | 0.1 | 4 | 5 | 2 | 3 |
| 7 | 7 | 43 | 18 | 136 | 24 | 0.1 | 0.1 | 0.4 | 0.1 | 4 | 3 | 4 | 3 |
| 8 | 8 | 86 | 30 | | 40 | 0.2 | 0.1 | | 0.1 | 3 | 4 | 2 | 3 |
| Engine No. 4: | | | | | | | | | | | | | |
| 1 | 1 | 78 | 184 | 24 | 20 | 0.2 | 0.6 | 0.1 | 0.1 | 3 | 6 | 2 | 2 |
| 2 | 2 | 86 | 96 | | 20 | 0.2 | 0.3 | | 0.1 | 4 | 4 | 3 | 3 |
| 3 | 3 | 61 | 88 | | 60 | 0.2 | 0.3 | | 0.2 | 3 | 4 | 3 | 4 |
| 4 | 4 | 1,840 | 24 | 24 | 20 | 6.0 | 0.1 | 0.1 | 0.1 | 13 | 3 | 3 | 3 |
| 5 | 5 | 883 | 24 | 56 | 20 | 2.9 | 0.1 | 0.1 | 0.1 | 10 | 3 | 4 | 3 |
| 6 | 6 | 338 | 24 | | 24 | 1.0 | 0.1 | | 0.1 | 5 | 3 | 2 | 3 |
| 7 | 7 | 160 | 18 | 104 | 32 | 0.5 | 0.1 | 0.3 | 0.1 | 4 | 3 | 4 | 4 |
| 8 | 8 | 52 | 20 | | 32 | 0.1 | 0.1 | | 0.1 | 3 | 3 | 2 | 3 |

From Table I it will be seen that as the quantity of chloride ion content is increased, the length of the silver chloride stain (i.e., that portion of the composite which is converted to the lighter colored silver chloride) is proportionately increased in length.

In testing for the detection of salt water present in used marine lubricating oils, 25 ml. of the lubricating oil may be poured into a 100 ml. graduated centrifuge tube. Thereafter, a petroleum solvent (e.g., kerosine) is added to the 50 ml. mark, and the contents are thoroughly shaken. 5 ml. of distilled water are then added and the In Table II, above, engines No. 1 and No. 2 are outer port and outer starboard engines, respectively, while engines No. 3 and No. 4 are inner port and inner starboard engines, respectively. From the data of Table II, is will be noted that the system waters employed in the outer system have the largest extent of sea-water contamination, while the system waters employed in the inner system show a low chloride ion level. It will also be noted from the table that the sea-water contamination level of systems water employed in the outer system engines reached a relatively high level measured in terms of chloride content in p.p.m. On the other hand, the seawater contamination level of system waters employed in the inner system engines, remained at the aforementioned same low chloride level. This was found to compare favorably with the chloride level of fresh water in the ship's storage tanks.

It will be noted that the method of the present invention makes possible the determination of the presence of relatively small quantities of chloride ion in aqueous solutions, by virtue of the distribution of relatively small quantities of silver chromate particles over a relatively large surface area of the absorbent material. If the same relatively small quantity of silver chromate particles were present as a concentrated mass and without the benefit of the absorbent material, any color change would be observed throughout the entire silver chromate mass, however the quantity of chloride ion present in the aqueous solution being tested could not, from a practical standpoint, be determined because of the relatively small surface area that the silver chromate would occupy within the tube. On the other hand, if relatively large quantities of silver chromate were employed, the presence of relatively small quantities of chloride ion would be insufficient to effect a noticeable color change.

While a preferred embodiment of the improved method and the apparatus of the present invention have been described for the purpose of illustration, it should be understood that various modifications and adaptations thereof, which will be obvious to those skilled in the art, may be made without departing from the spirit of the invention.

What is claimed is:

1. A method for determining the presence of chloride ion in an aqueous solution which comprises providing an aqueous solution containing chloride ion and adjusted to a pH value between about 6 and about 10, providing a composite comprising silver chromate deposited on an absorbent, and contacting said composite with said aqueous solution whereby silver chloride is formed.

2. The method of claim 1 in which said composite comprises silver chromate in an amount between about 0.25 percent and about 5 percent, by weight, and, correspondingly, absorbent in an amount between about 99.75 percent and about 95 percent, by weight, of said composite.

3. The method of claim 1 in which said composite comprises silver chromate in an amount between about 0.25 percent and about 0.5 percent, by weight, and, correspondingly, absorbent in an amount between about 99.75 percent and about 99.5 percent, by weight, of said composite.

4. A method for determining the presence of chloride ion in a lubricating oil which comprises contacting said lubricating oil with water to form an oil phase and an aqueous phase containing dissolved chloride ion, adjusting said aqueous phase to a pH value between about 6 and about 10, providing a composite comprising silver chromate deposited on an absorbent, and contacting said composite with at least a portion of said aqueous phase whereby silver chloride is formed.

5. A method for determining the presence of chloride ion in an aqueous solution which comprises providing an aqueous solution containing chloride ion and adjusted to a pH value between about 6 and about 10, providing a tube containing a composite comprising silver chromate deposited on an absorbent, and immersing an open end of said tube in said aqueous solution whereby said composite is contacted with said aqueous solution and silver chloride is formed.

6. A method for determining the presence of chloride ion in a lubricating oil which comprises contacting said lubricating oil with water to form an oil phase and an aqueous phase containing dissolved chloride ion, adjusting said aqueous phase to a pH value between about 6 and about 10, providing a tube containing a composite comprising silver chromate deposited on silica gel, and immersing an open end of said tube in said aqueous phase whereby said composite is contacted with said aqueous phase and silver chloride is formed.

References Cited by the Examiner

UNITED STATES PATENTS 2,174,349   9/39   Littlefield _____ 23—232

FOREIGN PATENTS 690,290   4/53   Great Britain.

MORRIS O. WOLK, *Primary Examiner.*

JAMES H. TAYMAN, JR., *Examiner.*